(12) United States Patent
Joseph et al.

(10) Patent No.: US 6,849,098 B1
(45) Date of Patent: Feb. 1, 2005

(54) COMPOSITE TOOLING

(75) Inventors: Brian E. Joseph, Wheeling, WV (US); Darren Kenneth Rogers, Wheeling, WV (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 0 days.

(21) Appl. No.: 09/941,342

(22) Filed: Aug. 29, 2001

Related U.S. Application Data

(63) Continuation-in-part of application No. 09/453,729, filed on Dec. 2, 1999, now abandoned, and a continuation-in-part of application No. 09/902,828, filed on Jul. 10, 2001, now Pat. No. 6,749,652.

(51) Int. Cl.[7] .............................................. C10L 5/00
(52) U.S. Cl. ..................... 44/620; 44/607; 264/29.6; 264/29.7; 423/445 R; 423/448; 423/460; 428/543
(58) Field of Search ................ 44/620, 607; 264/29.6, 264/29.7; 423/445 R, 448, 460; 428/543

(56) References Cited

U.S. PATENT DOCUMENTS

| | | | |
|---|---|---|---|
| 3,309,437 A | * 3/1967 | Harnett | ........................ 423/460 |
| 3,632,385 A | 1/1972 | Schmitt et al. | |
| RE28,574 E | 10/1975 | Ruoff | |
| 4,190,637 A | * 2/1980 | Kennedy | ..................... 423/448 |
| 4,619,796 A | 10/1986 | Awata et al. | |
| 4,681,718 A | * 7/1987 | Oldham | ....................... 264/102 |
| 4,851,280 A | 7/1989 | Gupta | |
| 4,879,182 A | 11/1989 | Presswood et al. | |
| 5,211,786 A | 5/1993 | Enloe et al. | |
| 5,282,734 A | 2/1994 | Pastureau et al. | |
| 5,648,027 A | 7/1997 | Tajiri et al. | |
| 5,686,038 A | 11/1997 | Christensen et al. | |
| 5,709,893 A | 1/1998 | McCarville et al. | |
| 5,730,915 A | * 3/1998 | Cornie | ....................... 264/29.1 |
| 5,868,974 A | 2/1999 | Kearns | |
| 5,937,932 A | * 8/1999 | Cornie | ........................ 164/526 |
| 5,984,256 A | 11/1999 | Endo | |
| 6,024,555 A | 2/2000 | Goodridge et al. | |
| 6,093,245 A | 7/2000 | Hammond et al. | |
| 6,099,792 A | 8/2000 | Ganguli et al. | |
| 6,241,957 B1 | 6/2001 | Stiller et al. | |
| 6,346,226 B1 | 2/2002 | Stiller et al. | |
| 6,387,343 B1 | 5/2002 | Klett | |

FOREIGN PATENT DOCUMENTS

GB  1489690  * 10/1977

OTHER PUBLICATIONS

Kirk–Othmer, Encyclopedia of Chemical Technology, 4 th ed., vol. 6, JohnWiley & Sons, Inc. Application of Coal Petrology & Petrography, pp. 429–434 and 454–455, 1993.*
Burchell, T.D., J.W. Klett, and C.E. Weaver, "A Novel Carbon Fiber Based Porous Carbon Monolith," Proceedings of the Ninth Annual Conference on Fossil Energy Materials, Oak Ridge, TN, May 16–18, 1995, CONF–9405204, ORNL/FMP–95/1.pp. 447–456, Pub. Oak Ridge National Lab., Aug. 1995.

* cited by examiner

*Primary Examiner*—Cephia D. Toomer
(74) *Attorney, Agent, or Firm*—McQuireWoods LLP

(57) ABSTRACT

Carbonaceous, composite tooling fabricated from pitch-based or coal-based cellular or porous products, "carbonaceous foams" having a density of preferably between about 0.1 g/cm$^3$ and about 0.8 g/cm$^3$ that are produced by: 1) conventional pitch foaming processes or; 2) the controlled heating of coal particulate preferably up to ¼ inch in diameter in a "mold" and under a non-oxidizing atmosphere. According to a specifically preferred embodiment, the starting material coal has a free swell index as determined by ASTM test D720 of between about 3.5 and about 5.0.

11 Claims, 3 Drawing Sheets

COMPOSITE TOOLING

This application is a continuation-in-part of U.S. patent application Ser. No. 09/902,828, filed Jul. 10, 2001, now U.S. Pat. No. 6,749,652 and entitled "Cellular Coal Products and Processes, which is a continuation-in-part of U.S. patent application Ser. No. 09/453,729, filed Dec. 12, 1999, now abandoned.

This invention was made with Government support under F33615-00-C-5007 awarded by the Air Force Research Laboratory. The Government has certain rights in the invention.

FIELD OF THE INVENTION

The present invention relates to tooling useful in the fabrication of structural and other members from composite materials such as reinforced polymer composites and the like and, more particularly to such tooling manufactured from carbon foams.

BACKGROUND OF THE INVENTION

The fabrication of, for example, structural members from composite materials generally involves "winding" or otherwise wrapping or applying a "green" or "prepeg" form of the composite material upon a mandrel or to other shaped tooling such as a mold, curing the thus applied composite material and then removing the shape from the tooling. Many materials and technologies exist for the production of filament winding mandrels and composite tooling in instances where production volumes or quantities are large or where cost is not an issue. More challenging, however, are the cases of limited production of prototype parts and the refinement of tooling designs during experimental programs or production troubleshooting. For example, the military has demonstrated an interest in developing tooling options for limited quantity production, depot-level maintenance and the fabrication of tooling spare parts.

The properties of such composite tooling include: 1) tailorable thermal expansion characteristics potentially matching those of the commonly used carbon-bismaleamide, invar, steel and aluminum tooling materials commonly in use; 2) compatibility with high-temperature service to enable adequate curing of a wide variety of resin systems used in composite fabrication; 3) machineability to allow on-site repair and modification; and 4) relatively low cost.

The molds used in the fabrication and curing of polymer matrix composites have been constructed from a wide variety of materials including invar, steel, aluminum, monolithic graphite, castable ceramics and carbon-epoxy and carbon-bismaleimide systems. Mold materials must exhibit high flexural and tensile strengths and durability, but perhaps most importantly, they must possess a tailorable thermal expansion to match that of the material being formed. Vacuum integrity and low heat capacity to allow relatively short heating and cooling times and thereby shorten fabrication cycles are also of vital importance for such tooling. The tooling materials of the prior art were often chosen on the basis of one or two or these desirable properties, such as strength and durability in the case of metals, at the expense of others such as tailorable thermal expansion, low heat capacity and ease of modification.

One attractive such metal mold material is Invar 36, a low carbon, 36% nickel austenitic steel that exhibits a low coefficient of thermal expansion (CTE), excellent durability and the ability to withstand high rates of thermal cycling. Its fundamental shortcomings are its low thermal conductivity and its weight. It is five times heavier than carbon-epoxy tooling of the same volume, therefore often requiring its application over lighter weight carbon-epoxy backing structures.

Other approaches to solving the composite tooling issue include electroforming a thick nickel layer over a mandrel that is subsequently removed, composite or graphite tooling over which is sprayed a metallic layer, and plastic faced plaster (PFP. Filament winding mandrels are often formed from metals, inflatable rubber bladders, or aluminum honeycombs with fiber-reinforced polymer facesheets.

One of the major difficulties with the formation of large parts is the magnification of any CTE mismatch over a large area This results in "spring-back" or "spring-in" as the formed composite part pulls away from the tool or squeezes the tool, depending upon the direction of the CTE mismatch. An excessive CTE on the female mold can cause the part to be crushed or trapped during cooling, while too low a CTE on the male tool can cause the part to lock onto the tool. An important consideration that is often ignored by mold or tooling designers is the anisotropy of composite CTE. For some polymer matrix composites, the difference in CTE between reinforcement and matrix directions can be as great as 72 ppm/° C. An often proposed solution to this issue is to lower the temperature of the cure process to minimize these differences, but this is not possible with some resin systems or practical in terms of the effect on curing time.

U.S. patent application Ser. No. 09/453,729, filed Dec. 2, 1999, now abandoned and entitled "Cellular Coal Products and Processes", and U.S. Pat. application Ser. No. 09/902,828, filed Jul. 7, 2001, now U.S. Pat. No. 6,749,652 and entitled "Cellular Coal Products and Processes" describe coal-based cellular or porous products having a density of preferably between about 0.1 $g/cm^3$ and about 0.8 $g/cm^3$ that are produced by the controlled beating of coal particulate preferably up to 1 mm in diameter in a "mold" and under a non-oxidizing atmosphere. According to specifically preferred embodiments, the coal-based starting materials exhibit a "free swell index" as determined by ASTM test D720 of between about 3.5 and about 5.0. The porous products produced by these processes, preferably as a net shape or near net shape, can be readily machined using conventional techniques, adhered and otherwise fabricated to produce a wide variety of low cost, low density products, or used in their preformed shape. Such cellular products have been shown to exhibit compressive strengths of up to about 4000 psi. As described in the foregoing U.S. patent applications, the properties of such coal-based carbon foams, i.e. strength, thermal conductivity etc. can be tailored within relatively broad ranges according to the requirements of a particular application.

The application of such coal-based carbon foam materials to tooling for composite materials applications would solve most, if not all of the problems with the prior art such composite tooling materials described above.

OBJECT OF THE INVENTION

It is therefore an object of the present invention to provide highly improved composite tooling that overcomes a significant number of the shortcomings of prior art composite tooling.

SUMMARY OF THE INVENTION

According to the present invention, there is provided carbonaceous, composite tooling fabricated from pitch-based or coal-based cellular or porous products, "carbonaceous foams" having a density of preferably between about 0.1 g/cm$^3$ and about 0.8 g/cm$^3$ that are produced by: 1) conventional pitch foaming processes or; 2) the controlled heating of coal particulate preferably up to ¼ inch in diameter in a "mold" and under a non-oxidizing atmosphere. According to a specifically preferred embodiment, the starting material coal has a free swell index as determined by ASTM test D720 of between about 3.5 and about 5.0.

The invention includes a tooling for the fabrication of composite materials comprising a carbonaceous foam having a density of between about 0.10 and about 0.80 g/cm$^3$, a coefficient of thermal expansion of between about 0.5 and about 6.5 and a thermal conductivity below about 1.

DETAILED DESCRIPTION

Figure 1:
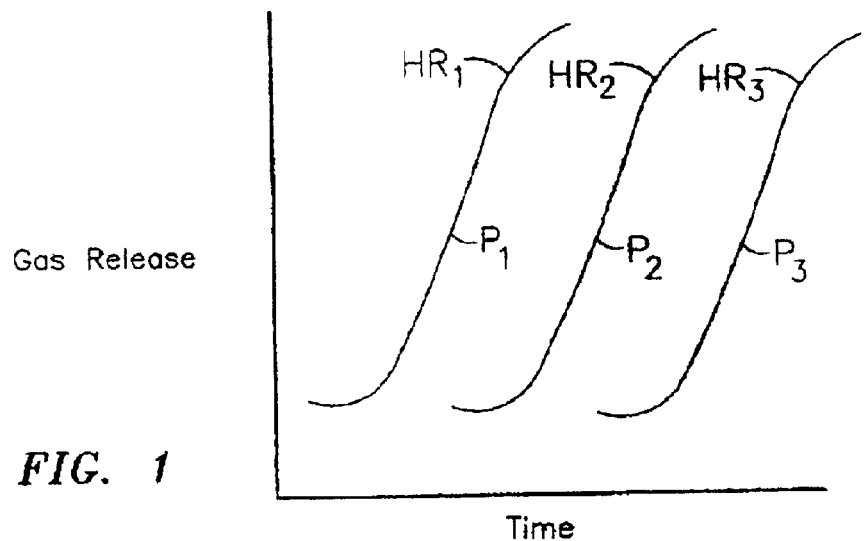
FIG. 1 is a graph of showing the general relationship between gas evolution and time/temperature at various operating pressures and temperatures for the process of the present invention.

The present invention describes tailorable composite tooling, i.e. tooling suitable for the fabrication of winding mandrels or other suitable curing tools, fabricated from a lightweight carbon foam that is produced by the thermal decomposition and foaming of pitch or coal derivatives under controlled conditions. The materials described herein are especially attractive as composite tooling materials because they offer much lower density than conventional tooling, low, but tailorable thermal expansion coefficients and thermal conductivities and good elevated temperature performance. Composite tooling fabricated from the materials described herein are readily machined and repaired and produced from very inexpensive raw materials, i.e. coal or pitch, which are commonly available for pennies per pound.

While the foaming process described herein is not readily portable, the composite tooling materials described herein offer features that make them amenable to local level fabrication into composite tooling. For example, the carbon foams can be produced as large flat sheets, prismatic bricks, or even conformable blanks that can be readily assembled into larger structures through the use of, for example, graphite-phenolic adhesives or can be machined easily into virtually any desired geometry. Conventional machining practices using carbide tooling and dust removal systems to capture liberated, health hazard free graphite-like particles can be applied in the fabrication. Thus, such materials can be fabricated into large or complex structures from smaller carbon foam building blocks and additionally adhered to dissimilar facesheet materials, should this be desirable.

The composite tooling of the present invention comprises a tooling structure, be it a mandrel, mold or other suitable forming structure, fabricated from a pitch-based or coal-based cellular or porous product, i.e. a foam, having a density of preferably between about 0.1 g/cm$^3$ and about 0.8 g/cm$^3$. According to a highly preferred embodiment the foam is coal-based and produced by the controlled heating of coal particulate preferably up to ¼ inch in diameter in a "mold" and under a non-oxidizing atmosphere. According to a specifically preferred embodiment, the starting material is a coal having a free swell index as determined by the standard ASTM D720 test of between about 3.5 and about 5.0. Such carbon based foams, without further treatment and/or the addition of strengthening additives exhibit compressive strengths of up to about 4000 psi. Impregnation with appropriate materials or the incorporation of various strength improving additives can further increase the compressive, tensile and other properties of these cellular materials. Although a wide variety of coals meeting the foregoing requirements can be use to produce the carbon foam materials described herein, they are preferably bituminous, agglomerating coals that have been comminuted to an appropriate particle size, preferably to a fine powder below about −60 to −80 mesh.

The preferred cellular pitch or coal-based materials described herein are semi-crystalline or more accurately turbostratically-ordered and largely isotropic i.e., demonstrating physical properties that are approximately equal in all directions. The cellular pitch or coal-based products of the present invention typically exhibit pore sizes on the order of less than 300$\mu$, although pore sizes of up to 500$\mu$ are possible within the operating parameters of the processes described. The thermal conductivities of the cellular pitch or coal-based products are generally less than about 1.0 W/m/°K. Typically, the cellular pitch or coal-based products of the present invention demonstrate compressive strengths on the order of from about 2000 to about 6000 psi at densities of from about 0.4 to about 0.5 g/cm$^3$.

It is most desirable to the successful production of composite tooling of the present invention from the coal-based foams described herein that the coal starting material exhibit the previously specified free swell index of between about 3.5 and about 5.0 and preferably between about 3.75 and about 4.5. Selection of starting materials within these parameters was determined by evaluating a large number of coals characterized as ranging from high to low volatiles. In general, it has been found that bituminous coals exhibiting free swell indexes within the previously specified ranges provided the best foam products for the production of composite tooling in that they exhibit the lowest calcined foam densities and the highest calcined foam specific strengths (compressive strength/density). Coals having free swell indices below these preferred ranges may not agglomerate properly leaving a powder mass or sinter, but not swell or foam, while coals exhibiting free swell indices above these preferred ranges may heave upon foaming and collapsed upon themselves leaving a dens compact. Pitch-based foams that can be successfully used in accordance with the present invention must exhibit the properties described hereinabove and hereinafter for the carbonaceous foams suitable for the fabrication of composite tooling and are in turn prepared using conventional pitch foaming techniques well known in the carbon arts.

The preferred coal-based foam production method of the present invention comprises: 1) heating a coal particulate of preferably small i.e., less than about ⅛ inch particle size in a "mold" and under a non-oxidizing atmosphere at a heat up rate of from about 1 to about 20° C. to a temperature of between about 300 and about 700° C.; 2) soaking at a temperature of between about 300 and 700° C. for from about 10 minutes up to about 12 hours to form a preform or finished product; and 3) controllably cooling the preform or finished product to a temperature below about 100° C. The non-oxidizing atmosphere may be provided by the introduction of inert or non-oxidizing gas into the "mold" at a pressure of from about 0 psi, i.e., free flowing gas, up to about 500 psi. The inert gas used may be any of the commonly used inert or non-oxidizing gases such as nitrogen, helium, argon, $CO_2$, etc.

It is generally not desirable that the reaction chamber be vented or leak during the heating and soaking operation. The pressure of the chamber and the increasing volatile content therein tends to retard further volatilization while the cellular product sinters at the indicated elevated temperatures. If the furnace is vented or leaks during soaking, an insufficient amount of volatile matter may be present to permit inter-particle sintering of the coal particles thus resulting in the formation of a sintered powder as opposed to the desired cellular product. Thus, according to a preferred embodiment of the present process, venting or leakage of non-oxidizing gas and generated volatiles is inhibited consistent with the production of an acceptable cellular product.

Additional more conventional blowing agents may be added to the particulate prior to expansion to enhance or otherwise modify the pore-forming operation.

The term "mold", as used herein is meant to define a mechanism for providing controlled dimensional forming of the expanding coal. Thus, any chamber into which the coal particulate is deposited prior to or during heating and which, upon the coal powder attaining the appropriate expansion temperature, contains and shapes the expanding porous coal to some predetermined configuration such as: a flat sheet; a curved sheet; a shaped object; a building block; a rod; tube or any other desired solid shape can be considered a "mold" for purposes of the instant invention.

As will be apparent to the skilled artisan familiar with pressurized gas release reactions, as the pressure in the reaction vessel, in this case the mold increases, from 0 psi to 500 psi, as imposed by the non-oxidizing gas, the reaction time will increase and the density of the produced porous coal will increase as the size of the "bubbles" or pores produced in the expanded coal decreases. Similarly, a low soak temperature at, for example about 400° C. will result in a larger pore or bubble size and consequently a less dense expanded coal than would be achieved with a soak temperature of about 600° C. Further, the heat-up rate will also affect pore size, a faster heat-up rate resulting in a smaller pore size and consequently a denser expanded coal product than a slow heat-up rate. These phenomenon are, of course, due to the kinetics of the volatile release reactions which are affected, as just described, by the ambient pressure and temperature and the rate at which that temperature is achieved. These process variables can be used to custom produce the expanded coals of the present invention in a wide variety of controlled densities, strengths etc. These results are graphically represented in the Figure where the X axis is gas release, the Y axis is time and the individual curves represent different pressures of inert gas $P_1$, $P_2$, and $P_3$, different heat-up rates $HR_1$, $HR_2$, and $HR_3$, and $P_1<P_2<P_3$ and $HR_1<HR_2<HR_3$.

Cooling of the composite tooling preform or composite tooling product after soaking is not particularly critical except as it may result in cracking of the composite tooling preform or product as the result of the development of undesirable thermal stresses. Cooling rates less than 10° C./min to a temperature of about 100° C. are typically used to prevent cracking due to thermal shock. Somewhat higher, but carefully controlled, cooling rates may however, be used to obtain a "sealed skin" on the open cell structure of the product as described below. The rate of cooling below 100° C. is in no way critical.

After expanding the coal particulate as just described, the porous coal product is an open celled material. Several techniques have been developed for "sealing" the surface of the open celled structure to improve its adhesive capabilities, for example, for the application of facesheets of dissimilar materials for further fabrication and assembly of a number of parts. For example, a layer of a commercially available graphitic adhesive can be coated onto the surface and cured at elevated temperature or allowed to cure at room temperature to provide an adherent skin. Alternatively, the expansion operation can be modified by cooling the expanded coal product or preform rapidly, e.g., at a rate of 10° C./min or faster after expansion. It has been discovered that this process modification results in the formation of a more dense skin on the preform or product which presents a closed pore surface to the outside of the preform or product. At these cooling-rates, care must be exercised to avoid cracking of the preform or product.

After expanding, the porous coal-based preform or product is readily machineable, sawable and otherwise readily fabricated using conventional fabrication techniques to fabricate the composite tooling described herein.

Subsequent to production of the preform or product as just described, the preform or product may be subjected to carbonization and/or graphitization according to conventional processes to obtain particular properties desirable for specific composite tooling applications. Additionally, a variety of additives and structural reinforcers may be added to the coal-based preforms or products either before or after expansion to enhance specific mechanical properties such as fracture strain, fracture toughness and impact resistance should these be required for a particular composite tooling application. For example, particles, whiskers, fibers, plates, etc. of appropriate carbonaceous or ceramic composition can be incorporated into the porous coal-based composite tooling preform or product to enhance its mechanical properties.

The open celled, coal-based composite tooling preforms or products of the present invention can additionally be impregnated with, for example, petroleum pitch, epoxy resins or other polymers using a vacuum assisted resin transfer type of process. The incorporation of such additives provides load transfer advantages similar to those demonstrated in carbon composite materials. In effect a 3-D composite is produced that demonstrates enhanced impact resistance and load transfer properties should these be required by a particular tooling application.

The cooling step in the expansion process results in some relatively minimal shrinkage on the order of less than about 5% and generally in the range of from about 2% to about 3%. This shrinkage must be accounted for in the production of near net shape composite tooling preforms or final products of specific dimensions and is readily determinable through trial and error with the particular coal starting material being used. The shrinkage may be further minimized by the addition of some inert solid material such as coke particles, ceramic particles, ground waste from the coal expansion process etc. as is common practice in ceramic fabrication so long as such additions do not adversely affect the thermal conductivity or elevated temperature performance of the tooling.

Carbonization, sometimes referred to as calcining, is conventionally performed by heating the preform or product under an appropriate inert gas at a heat-up rate of less than about 5° C. per minute to a temperature of between about 800° C. and about 1200° C. and soaking for from about 1 hour to about three or more hours. Appropriate inert gases are those described above that are tolerant of these high temperatures. The inert atmosphere is supplied at a pressure of from about 0 psi up to a few atmospheres. The carbonization/calcination process serves to remove all of the non-carbon elements present in the preform or product such as sulfur, oxygen, hydrogen, etc that might adversely affect the tooling in its application.

Graphitization, commonly involves heating the preform or product either before or after carbonization at heat-up rate of less than about 10° C. per minute, preferably from about 1° C. to about 5° C. per minute, to a temperature of between about 1700° C. and about 3000° C. in an atmosphere of helium or argon and soaking for a period of less than about one hour. Again, the inert gas may be supplied at a pressure ranging from about 0 psi up to a few atmospheres.

The preferred, coal-based porous composite tooling preforms and products of the present invention can be produced in any solid geometric shape. Such production is possible using any number of modified conventional processing techniques such as extrusion, injection molding, etc. In each of such instances, the process must, of course, be modified to accommodate the processing characteristics of the starting material coal. For example, in extruding such products, as described below, the coal powder starting material is fed by an auger into an expansion chamber where it is expanded and from which it is extruded while still viscous. Upon exiting the extrusion die, the material is cooled to provide a solid shape of the desired and precalculated dimensions. To improve the efficiency, i.e., cycle time of the process, the input material can be preheated to a temperature below the expansion point, e.g., below about 300° C., fed into the auger chamber where additional heat is imparted to the powder with final heating being achieved just before extrusion through the die.

Similar relatively minor process modifications can be envisioned to fabricate the carbon foams of the present invention for use as composite tooling in injection molding, casting and other similar conventional material fabrication processes.

As mentioned above, the carbonaceous foam materials of the present invention may be coated with a wide variety of facesheet materials. Such facesheet coatings include, for example, but not exclusively, Kevlar® reinforced carbonaceous foam, laminated E-glass reinforced vinyl esters, Thermal spray applied coatings of a metal, for example, aluminum or inconel etc. to achieve surface, heat transfer or thermal expansion properties compatible with specific composite materials formed on composite tooling produced as described herein. Such layers can be adhered to the carbonaceous foam core using any of a wide variety of, for example, graphite-epoxy adhesives available commercially.

As a further enhancement of the properties of the composite tooling described herein, functionally graded foams of varying density at their surfaces or throughout their structure may be prepared as described in copending U.S. patent application Ser. No. 09/733,602, filed Dec. 8, 2000. According to this invention, coal-based cellular products having integral stiffeners or load paths, directed heat transfer paths and directed mass transfer paths are provided through the placement of coal-based cells of a different size and/or density than those making up the matrix of the product during manufacture. There is also provided a method for the production of coal-based cellular products possessing these characteristics. The method described in this application utilizes the ability to select and design such properties through the proper selection and control of cell size and density. Such control of cell size and density is in turn achieved through appropriate selection of starting materials, starting material particle size, mold packing and processing parameters. This application is incorporated herein in its entirety.

The following examples will serve to illustrate the practice of the invention.

EXAMPLES

Example 1

Figure 2:
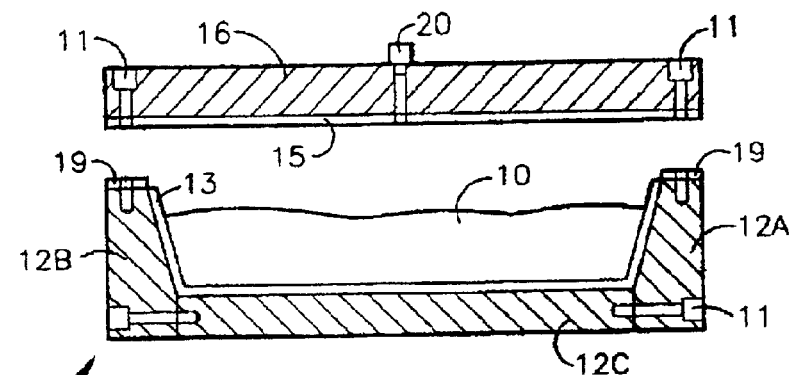
FIG. 2 is a cross-sectional view of a "mold" containing powdered coal prior to expansion in accordance with the process of the present invention.
Figure 3:
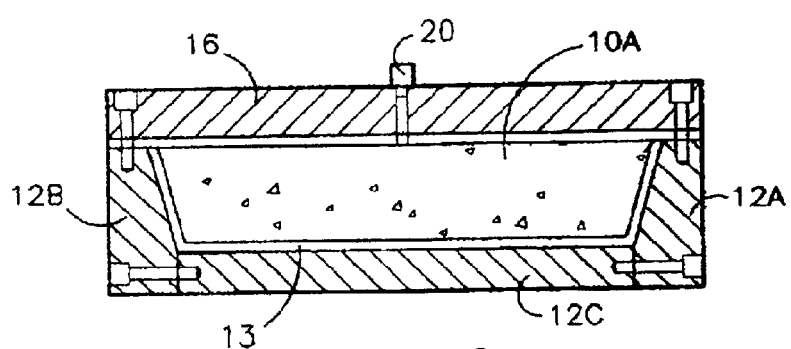
FIG. 3 is a cross-sectional view of the "mold" of FIG. 2 subsequent to expansion of the powdered coal in accordance with the process of the present invention.

As shown in FIG. 2, a layer 10 of comminuted bituminous coal having a free swell index of about 4 and ground to a particle size of about −60 mesh and about 2 inch deep is deposited in mold 12 equipped with a cover 16. Mold 12 is assembled from three individual pieces carbon or tool steel pieces, sides 12A and 12B and bottom 12C, all joined together by bolts 11 and lined with a ceramic glaze or spray applied ceramic lining 13. Cover 16 includes a similar interior ceramic lining 15 and Is attached to sides 12A and 12B with bolts 17 in the final assembly prior to heating. Gaskets 19 are preferably used to insure a tight fit of cover 16 onto sides 12A and 12B. Cover 16 is optionally equipped with a sintered vent plug 20 to permit purging of the interior of mold 12 with non-oxidizing gas. This configuration, incorporating valve 20 also permits pressurization, if desired to control expansion speed and/ or pore size in the final product as described hereinabove. Nitrogen gas is repeatedly introduced through valve 20 to assure that all oxygen in mold 12 is purged (generally 2–4 such purges have been found satisfactory) and to provide a one atmosphere pressure of nitrogen inside of mold 12. Mold 12 is then heated at a rate of from about 1 to about 10° C./min up to a temperature of about between about 450 and 600° C. and held at this temperature sufficient to devolatalize and sinter the cellular product (generally less than about one hour). This treatment results in the production of an open celled expanded coal product 10A as shown in FIG. 3. Mold 12 is then cooled to room temperature at a rate of less than about 10° C./min. to a temperature of 100° C.; any remaining pressure is then vented through valve 15 and the sample removed from mold 12 by disassembly of mold 12 by disengagement of bolts 11. Expanded coal product 10A is thereby readily removed from mold 14 and is subsequently sawed to the desired dimensions.

Product 10A has a density of between about 0.4 and about 0.6 g/cm$^3$ and demonstrates a compressive strength on the order of between about 2000 and 6000 psi. Thermal conductivity as determined by the guarded heat flow method is below about 1.0 W/m/K.

Example 2

Figure 4:
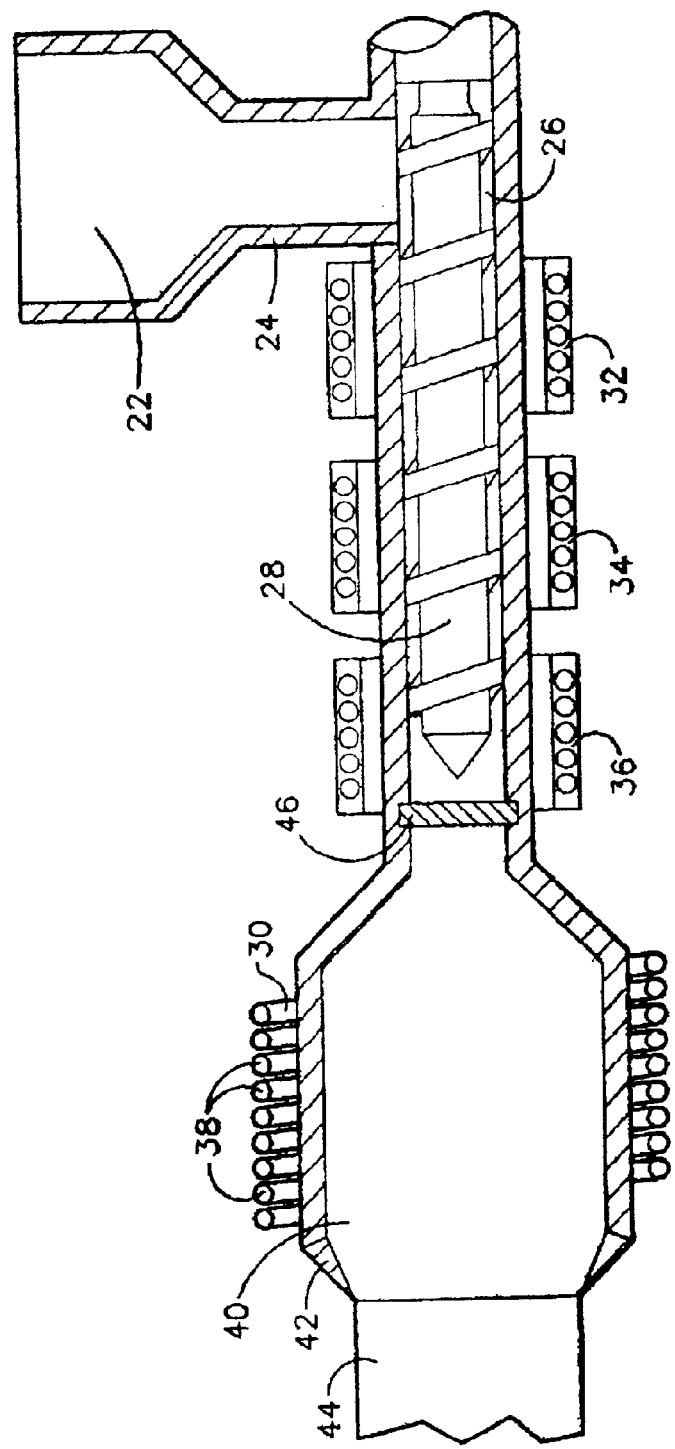
FIG. 4 is a cross-sectional diagram of an extruder suitable for the production of coal-based porous products in accordance with the present invention.

The application of the process of the present invention in an extrusion process is depicted in FIG. 4. As shown in that figure, comminuted bituminous coal 22 of a particle size of about −80 mesh is introduced via hopper 24 into chamber 26 equipped with auger 28 that moves particulate coal 18 through chamber 26 and into expansion chamber 30. Chamber 26 is heated by means of a series of barrel heaters 32, 34 and 36 to impart a temperature of less than about 300° C. to particulate coal 18 as it approaches and enters expansion chamber 26. As is conventional practice in extrusion, chamber 26 is divided into a feed section, a compression section and a metering section each defined roughly by the location of barrel heaters 32, 34 and 36 and imparted by the tapered shape of auger 28. Expansion chamber 30 is maintained under a non-oxidizing atmosphere and at a temperature of about 450° C. by means of barrel heater 38. Particulate coal 18 expands within chamber 26 to form expanded coal product 40 and, while still viscous, expanded coal product 40 is extruded through a die 42 to form solid shaped product 44 upon cooling to room temperature. Solid shaped product 44 demonstrates properties similar to those obtained from the product described in Example 1.

At the point where particulate coal 22 exits chamber 26 and enters expansion chamber 30, chamber 26 is preferably equipped with a breaker plate 46 that serves to break up any large agglomerates of particulate coal 22 that may have formed in transit within chamber 26.

Cellular coal-based extrudate 44 may have virtually any solid shape ranging from a large flat panel 4'×8' as might be used as the core of the above-described building panel to square shapes, rounds, channels and even tubular shapes if a bridge die is used in the extrusion process. Almost any shape that can be achieved with plastic or metal extrusion can be similarly obtained using the process of the present invention.

Figure 5:
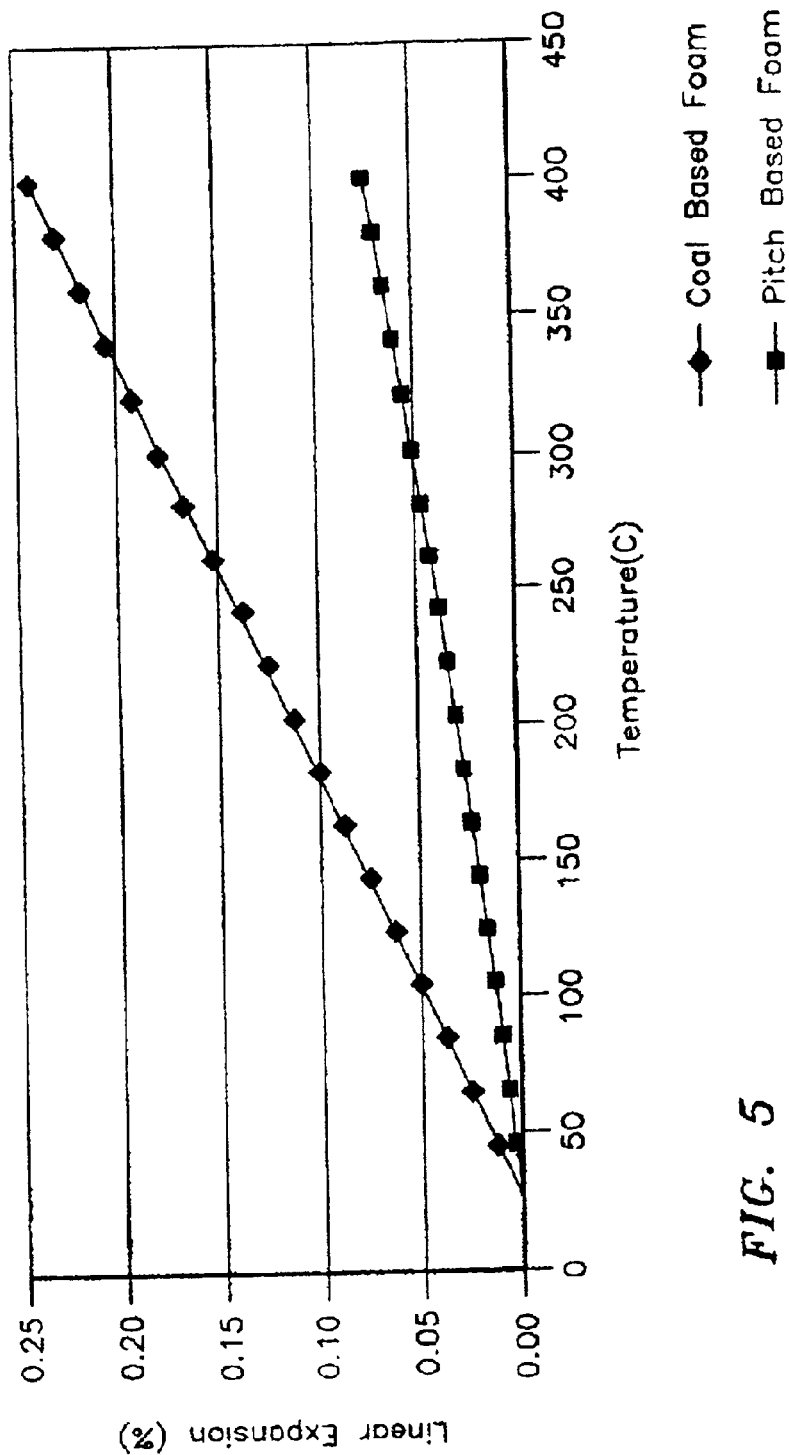
FIG. 5 is a graph of linear expansion versus use temperature for series of tailored foam tooling in accordance with the present invention.

A variety of carbonaceous foams exhibiting varying percent linear expansions can be produced and used in accordance with the successful practice of the present invention, i.e. the linear expansion can be tailored to meet the needs of any particular composite being fabricated on tooling produced in accordance with the present invention. A spectrum of such materials are shown in FIG. 5 which is a graph of linear expansion versus temperature for sample tooling produced from carbonaceous foams in accordance with the present invention.

As the invention has been described, it will be apparent to those skilled in the art that the same may be varied in many ways without departing from the spirit and scope of the invention. Any and all such modifications are intended to be included within the scope of the appended claims.

What is claimed is:

1. Tooling for the fabrication of composite materials comprising a tool body comprising carbonaceous foam, wherein the carbonaceous foam provides structural support for at least a portion of the composite material, and wherein the carbonaceous foam has a density ranging from about 0.10 to about 0.80 g/cm$^3$, a coefficient of thermal expansion ranging from about 0.5 to about 6.5 ppm/° C. and a thermal conductivity below about 1 W/m/° K, wherein the tool body is adapted for fabricating members from composite materials.

2. The tooling of claim 1 wherein said carbonaceous foam is pitch-based or coal-based.

3. The tooling of claim 2 wherein said carbonaceous foam is a semi-crystalline, largely isotropic, porous coal-based product produced from particulate coal exhibiting a free swell index of about 3.5 to about 5.0.

4. The tooling of claim 3 wherein said coal exhibits a free swell index of about 3.75 to about 4.5.

5. The tooling of claim 2 wherein the carbonaceous foam has a compressive strength below about 6000 psi.

6. The tooling of claim 2 wherein said carbonaceous foam has been carbonized.

7. The tooling of claim 2 wherein said carbonaceous foam has been graphitized.

8. The tooling of claim 1 further including a facesheet of a dissimilar material coated on the tool body.

9. The tooling of claim 1 wherein the density of said carbonaceous foam varies in density throughout the mass thereof.

10. The tooling of claim 1, wherein the tool body is formed of carbonaceous foam that was controllably cooled to a temperature below about 100° C. at a rate of 10° C./min or more to provide an outer surface of the carbonaceous foam with a density higher than a density of an outer surface of the carbonaceous foam when the carbonaceous foam is cooled at a rate of less than 10° C./min.

11. The tooling of claim 1, wherein the coefficient of thermal expansion of the carbonaceous foam is substantially similar to the coefficient of thermal expansion of the composite material.

\* \* \* \* \*